Feb. 23, 1932.　　　　　J. G. KING　　　　　1,846,521

COVER

Filed July 21, 1926

Jesse G. King Inventor

By Spencer, Sewall and Hardman his Attorneys

Patented Feb. 23, 1932

1,846,521

UNITED STATES PATENT OFFICE

JESSE G. KING, OF DAYTON, OHIO, ASSIGNOR, BY MESNE ASSIGNMENTS, TO FRIGIDAIRE CORPORATION, A CORPORATION OF DELAWARE

COVER

Application filed July 21, 1926. Serial No. 123,897.

This invention relates to covers and particularly to covers for openings in refrigerating cabinets of the type disclosed in the copending application of Jesse G. King, Serial No. 86,586, filed February 6, 1926, of which this is in part a continuation.

An object of this invention is to provide a well insulated cover for such a cabinet.

A further object is to provide suitable sealing means carried by the cover for preventing the transfer of warm air from the exterior to the interior of the cabinet.

Further objects and advantages will be apparent from the following description and accompanying drawings wherein illustrative embodiments of the invention are clearly shown and described.

Figure 1:
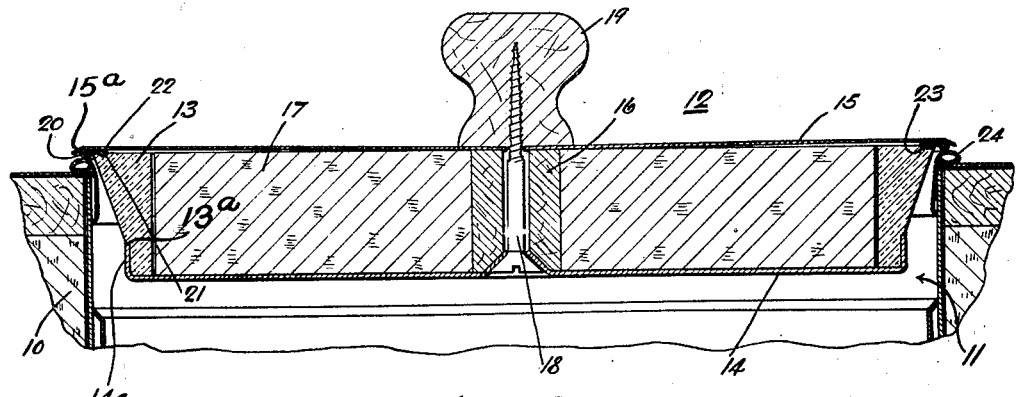
Fig. 1 is a sectional view showing a preferred form of this invention.

The top wall 10 of the refrigerating cabinet is provided with an opening 11 affording access to the interior of the cabinet, and the opening is closed by a cover 12. The construction of the cabinet top and the opening forms no part of the present invention and is fully described in the application referred to.

The cover 12 comprises an annular spacing member 13 and a central spacing member 16 which are constructed of relatively hard, thermally non-conducting impervious material such as wood, rubber or fiber. These spacers are located between a lower plate 14 and an upper plate 15 which are made preferably of rust-resisting metal. The plate 14 is provided with a flange 14a for engaging the outer surface of the spacer 13 and is then supported on the inwardly directed flange 13a of the annular spacing member 13. Insulating material 17, which is relatively soft, such as cork, fills the chamber formed by the spacers 13 and 16 and the plates 14 and 15. These parts are held in assembled relation by a screw 18 which passes through plates 14 and 15, a central aperture in the spacer 16 and threadedly engages a handle 19.

The top plate 15 is thus supported centrally, and its peripheral portion bears resiliently upon a gasket or flange 20, of any suitable resilient material, such as fabric or rubber, having a bead portion 21 enclosing a wire ring 22 and received by a groove 23 provided in the upper side of the spacer 13. The gasket 20 projects beyond the spacer 13 forming an outwardly directed flange for said spacer and is adapted to engage a bead member 24 supported by the top wall 10, and receives pressure due to the weight of the cover which is transmitted to it by the peripheral portion of the plate 15 which plate is preferably bent around said gasket or flange at 15a. Thus the gasket 20 tends to seal the opening 11 from warmer air outside the cabinet.

Figure 2:
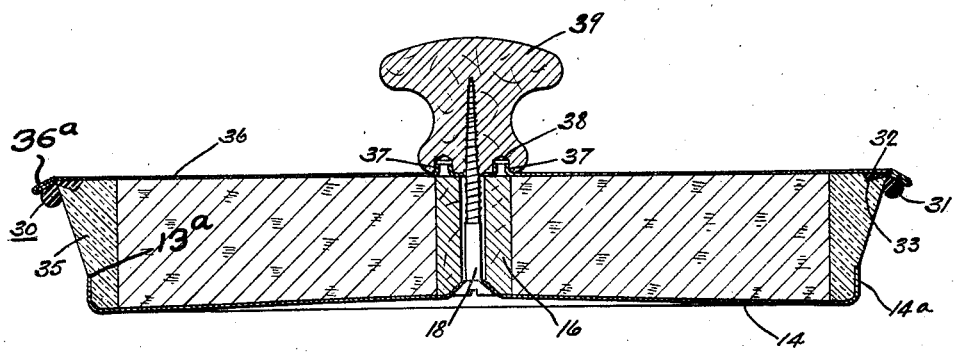
Fig. 2 is a section similar to Fig. 1 illustrating a modification.

In the modification shown in Fig. 2, in which the parts 14a and 13a are the same as in Fig. 1, a gasket 30 is provided with an annular portion 31 which is circular in cross-section and with an annular portion 32 which is triangular in cross-section forming an outwardly directed flange for the spacer 35. The triangular portion 32 is received by a V-shaped recess 33 provided in the upper side of an annular spacer 35. The gasket is retained in the recess entirely by the spring action of a top plate 36 which is bent around the gasket or flange 30 at 36a and the plate is flush with the top side of the annular spacer. The central part of the top plate is punched upwardly at one or more places to form tubular projections 37 which are received by recesses 38 provided in a handle 39. The sides of the recess 38 form shoulders which cooperate with the projections 37 to prevent relative rotation of the handle and top plate 36, and thus prevent loosening of the screw. The tubular form of the punched portion 37 provides a very strong projection for cooperating with the handle.

It will be appreciated that the peripheral spacing member co-operates with the top and bottom plates in both modifications to seal the space within. This is due to the flange 14a which fits over the lower edge of the spacing ring, and the gasket 23 or 31 against which the upper plate is firmly clamped by the screw and knob. It will also be noticed that while the screw 18 passes thru both plates 14 and 15 the lower plate is countersunk to receive the screw head and thus provides a lid having a perfectly smooth bottom surface. This last feature is important when it is considered that when the lids, as ordinarily used on ice cream cabinets, soda fountains and the like, are removed from the openings 11 they are dropped on other lids or on the top surface of the cabinet. Therefore, it is necessary to have no projections which could scratch the tops of cabinets.

While the forms of embodiments of the present invention as herein disclosed, constitute preferred forms, it is to be understood that other forms might be adopted, all coming within the scope of the claims which follow.

What is claimed is as follows:

1. A cover for an opening in a refrigerating cabinet comprising a peripheral spacing member having a recessed portion on its upper side and adjacent its periphery, a flexible ring seated in said recessed portion and projecting therefrom, a bottom plate, a resilient top plate, said top plate serving to retain the flexible ring seated in the recessed portion, a central spacing member, insulating means beween the aforementioned plates, and tie means passing through the plates and the central spacing member.

2. A cover for an opening in a refrigerating cabinet comprising a peripheral spacing member of impervious, relatively hard insulating material, top and bottom plates, a central spacing member of relatively hard insulating material, relatively soft insulating means between the aforementioned plates inside said peripheral spacing member and outside said central spacing member and tie means passing through the plates and the central spacing member.

3. A cover for an opening in a refrigerating cabinet comprising in combination, a top plate, a bottom plate, tie means holding the plates together, a peripheral spacing member and a central spacing member holding the plates apart, thermal insulation in the space between the plates and spacing member, the peripheral spacing member having a portion adjacent the top plate cut away to form a groove between the spacing member and top member, and a gasket in the groove and projecting therefrom.

4. A cover, for an opening in the top of an ice cream cabinet affording access to the interior of an ice cream receptacle therebelow, comprising a top plate, a bottom plate, an annular spacer separating said plates adjacent the periphery thereof, a circular central spacer separating said plates centrally thereof, heat insulating material in the chamber thus formed, and tie means connecting said plates together in such spaced relation.

5. A closure for an opening in a refrigerating cabinet comprising a pair of separate plates, a continuous rigid peripheral spacing member, and tie means centrally of said spacing member, acting in a single line to hold the plates and spacing member together.

6. A closure for an opening in a refrigerating cabinet comprising a pair of separate plates, a continuous rigid peripheral spacing member, a handle and tie means passing into the handle and acting in a single line centrally of said spacing member to hold the plates, handle, and spacing member together.

7. A closure for an opening in a refrigerating cabinet comprising a pair of separate plates, a continuous peripheral spacing member, a gasket disposed between one plate and the spacing member and projecting beyond the spacing member to engage the cabinet, and tie means acting in a single line to hold the plates, the spacing member, and gasket together.

8. A closure for an opening in a refrigerating cabinet comprising a pair of plates, a continuous peripheral spacing member having a recess therein, one of said plates co-operating with the spacing member adjacent said recess to form a groove, a gasket in said groove projecting beyond the spacing member to engage the cabinet, and tie means acting in a single line to hold said plate, gasket, and spacing member together.

9. A closure for an opening in a refrigerating cabinet comprising a pair of separate plates, a continuous rigid peripheral spacing member, tie means centrally of said spacing member acting in a single line to hold the plates and spacing member together, and a second spacing member holding the plates apart along the line of said tie means.

10. A closure for an opening in a refrigerating cabinet comprising a top plate, a bottom plate, a peripheral spacing member for the plates, a handle resting on the top plate, threaded tie means centrally of said spacing member passing into the handle and acting in a single line to hold the plates, handle and spacing means together, and cooperating shoulder means and projection means disposed one on said handle and the other on said top plate to prevent relative rotation of the handle and plate.

11. Apparatus as defined in claim 10 wherein the shoulder means is formed by a recess in the handle and the projection means is formed by a portion punched outwardly from the body of the top plate.

12. Apparatus as defined in claim 10 in which the shoulder means is provided by the recess in the handle and the projection means is formed by a tubular portion punched out of the body of the top plate.

In testimony whereof I hereto affix my signature.

JESSE G. KING.